Aug. 6, 1940.   E. REINFELD   2,210,339
MULTIPLE TOOL HOLDER
Filed June 20, 1938   2 Sheets-Sheet 1
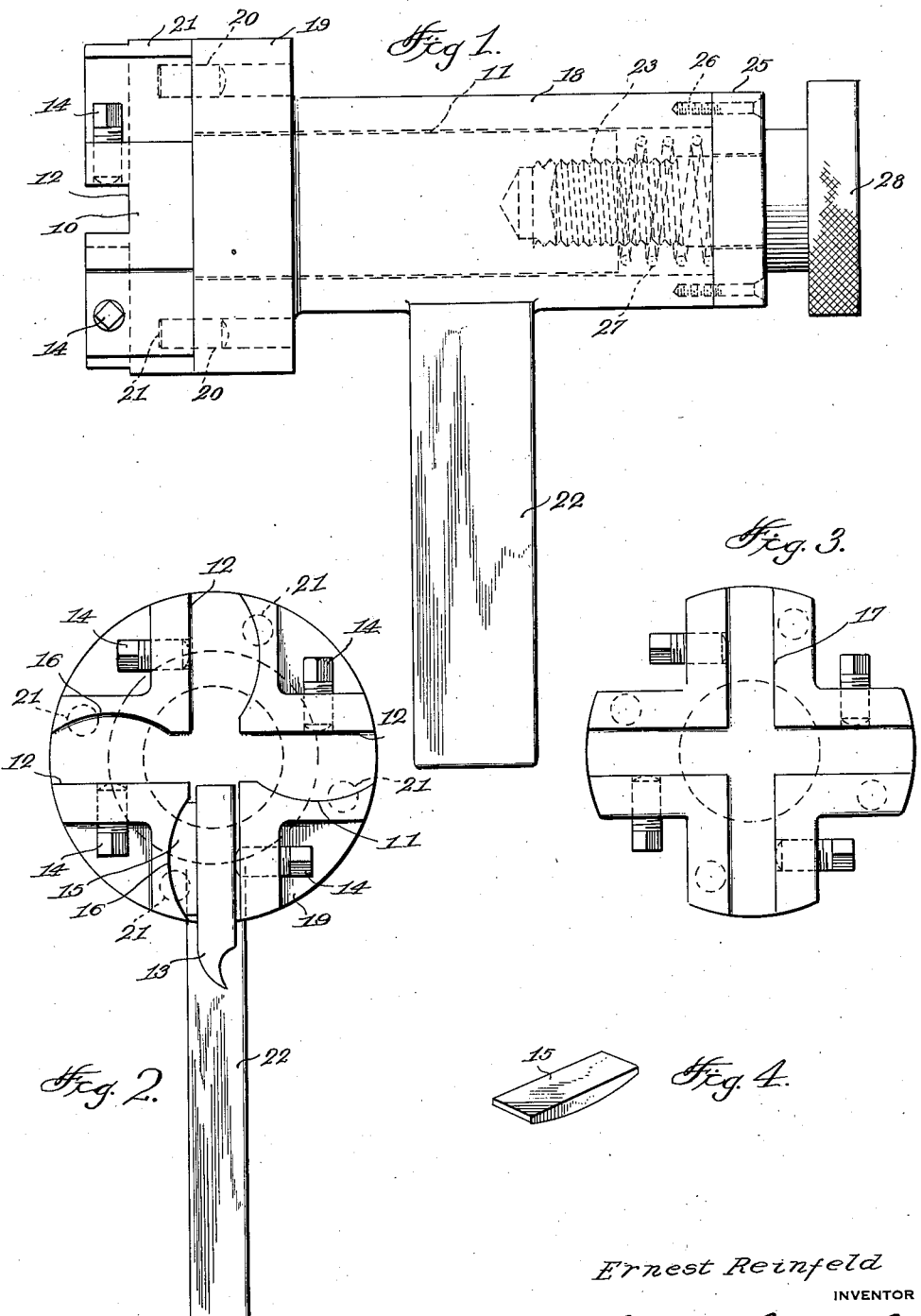
Ernest Reinfeld
INVENTOR
BY Victor J. Evans & Co.
ATTORNEYS
WITNESS J. C. Markey Aug. 6, 1940.  E. REINFELD  2,210,339

MULTIPLE TOOL HOLDER

Filed June 20, 1938  2 Sheets-Sheet 2

Ernest Reinfeld
INVENTOR

BY Victor J. Evans & Co.
ATTORNEYS

WITNESS J P Markey

Patented Aug. 6, 1940

2,210,339

UNITED STATES PATENT OFFICE 2,210,339

MULTIPLE TOOL HOLDER

Ernest Reinfeld, Akron, Ohio

Application June 20, 1938, Serial No. 214,753

1 Claim. (Cl. 29—49)

This invention relates to multiple tool holders and has for an object to provide a tool holder which will fit the tool post of any lathe or shaper.

A further object is to provide a multiple tool holder which may be easily and quickly swivelled to present a desired tool to the work.

A further object is to provide a multiple tool holder which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a side elevation of a multiple tool holder constructed in accordance with the invention.

Figure 2 is a front elevation of the tool holder with a tool therein.

Figure 3 is a front elevation of a modified form of turret for the tool.

Figure 4 is a detail perspective view of a rocker shim for use with the turret, shown in Figure 2.

Figure 5:
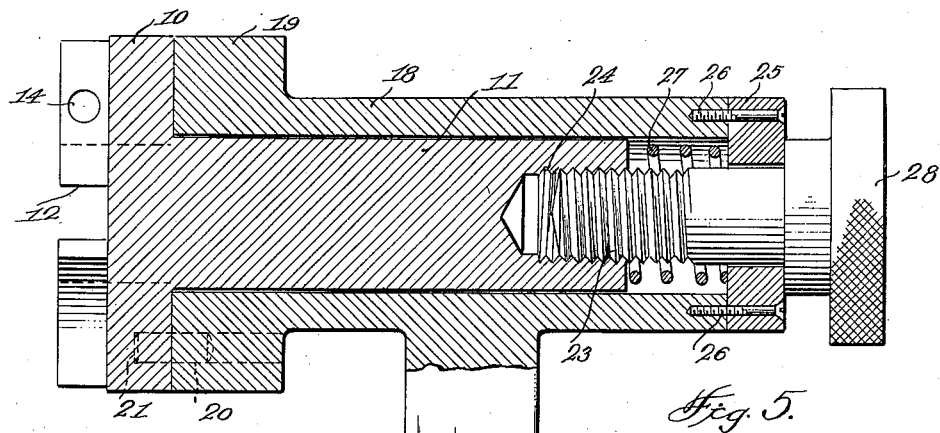
Figure 5 is a longitudinal sectional view of the tool with parts in elevation.
Figures 6, 7:
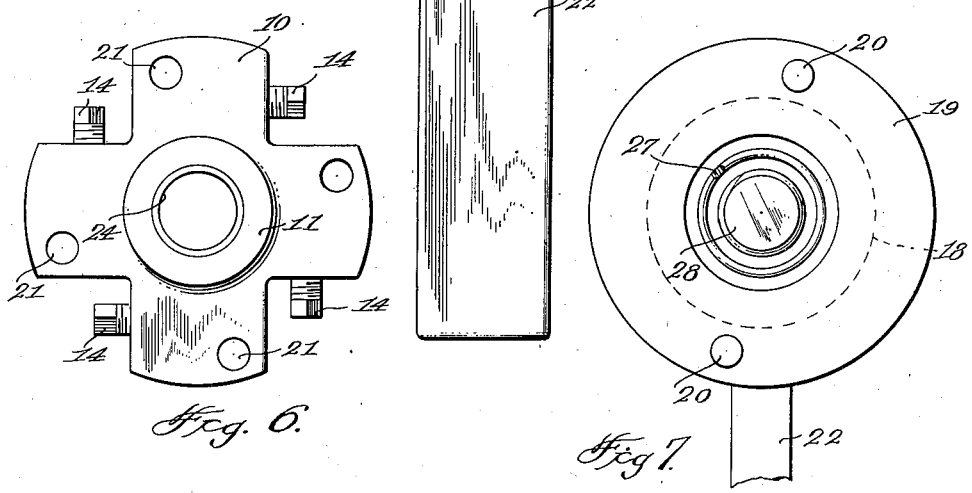
Figure 6 is a rear elevation of the turret.
Figure 7 is a rear elevation of the sleeve.
Figure 8:
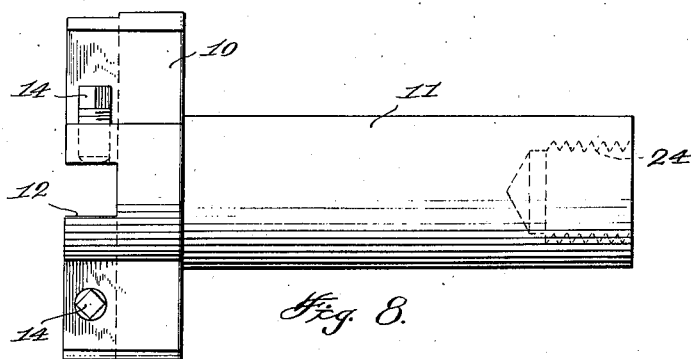
Figure 8 is a side elevation of the turret removed from the sleeve.

Referring now to the drawings in which like characters of reference designate similar parts in the various views, 10 designates the tool turret, the same being substantially cruciform in contour and being provided with an axial stem 11. The turret is provided in the front face with tool holding grooves 12 into which tools 13 may be clamped by set screws 14. Four different tools for performing different operations may be carried by the turret.

In the form of turret shown in Figure 2 rocker shims 15 are fitted into recesses 16 in the walls of the groove and the set screws clamp the tools against these shims while in the form of turret shown in Figure 3 the rocker shims are dispensed with and the walls of the grooves are straight as shown at 17.

The tool sleeve 18 rotatably and slidably receives the stem 11 of the turret. The sleeve terminates at one end in a collar 19. A pair of pins 20 project from the front face of the collar and are interchangeably received in openings 21 formed in the turret. The sleeve is provided with a shank 22 which extends at a right angle from the central portion of the sleeve and is adapted to fit the tool post of any lathe or shaper.

A screw 23 is threaded into a socket 24 formed axially in the end of the stem 11 of the turret. A washer 25 is fixed to the end of the sleeve by screws 26 and a helical spring 27 is sleeved on the screw between the washer and the end of the stem of the turret. The purpose of the spring is to eject the turret from the pins 20 of the sleeve when the screw 23 is backed out. The screw is provided with a knurled head 28 to facilitate manipulation of the screw when a different tool is to be presented to the work.

In operation the screw holds the turret against any axial movement with relation to the sleeve and when backed out enables the turret to be moved axially with relation to the sleeve. The turret may be then disengaged from the pins 20 and swivelled to present a desired one of the four tools to the work. Then the turret may be placed back on the pins and the screw tightened to secure the turret firmly in place.

From the above description it is thought that the construction and operation of the invention will be fully understood without further explanation.

What is claimed is:

A tool holder comprising a cruciform turret having radially disposed arms, there being tool holding grooves in the front faces of the arms, set screws engaged through the sides of the arms for locking respective tools in said grooves, a relatively long stem projecting axially from the rear face of the turret, a sleeve of greater length than the stem disposed loose on said stem, a disk head on the sleeve abutting said turret arms, pins projecting from the head, there being a plurality of openings in the turret arms interchangeably receiving said pins, said pins holding the turret against rotary movement in relation to the sleeve, a shank extending at a right angle from the center portion of the sleeve adapted to fit the tool post of a lathe, a screw threaded in the stem at the opposite end thereof from the turret and disposed in alinement with the axis of the stem, a washer on the screw fixed to the end of the sleeve, and a helical spring sleeved on the screw and confined under compression between the washer and the end of the stem, said screw when tightened holding the turret in engagement with said pins and preventing rectilinear movement of the stem with relation to the sleeve, said screw when loosened permitting the spring to expand and move the stem bodily in the sleeve to disengage the turret from the pins and permit the turret to be rotated to present a different tool to the work.

ERNEST REINFELD.